(12) United States Patent
Yeh et al.

(10) Patent No.: US 9,422,997 B2
(45) Date of Patent: Aug. 23, 2016

(54) MICRO-NANO FLUID DAMPER

(71) Applicant: National Applied Research Laboratories, Taipei (TW)

(72) Inventors: Fang-Yao Yeh, Taipei (TW); Kuo-Chun Chang, Taipei (TW); Tsung-Wu Chen, Taipei (TW); Chung-Han Yu, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 14/262,853

(22) Filed: Apr. 28, 2014

(65) Prior Publication Data

US 2015/0152933 A1 Jun. 4, 2015

(30) Foreign Application Priority Data

Dec. 2, 2013 (TW) .............................. 102143976 A
Jan. 23, 2014 (TW) .............................. 103102409 A

(51) Int. Cl.
*F16F 9/00* (2006.01)
*F16F 9/512* (2006.01)
*F16F 9/34* (2006.01)
*F16F 9/19* (2006.01)
*F16F 9/20* (2006.01)

(52) U.S. Cl.
CPC . *F16F 9/006* (2013.01); *F16F 9/19* (2013.01); *F16F 9/20* (2013.01)

(58) Field of Classification Search
CPC ............. F16F 9/006; F16F 9/19; F16F 9/512; F16F 9/3405; F16F 9/20; F16F 9/12; F16F 9/10; F16F 9/306; F16F 15/023; B25D 17/24

USPC ..................... 188/317, 322.5, 314
See application file for complete search history.

(56) References Cited

U.S. PATENT DOCUMENTS

| | | | | |
|---|---|---|---|---|
| 2002/0185347 A1* | 12/2002 | Pohl | ...................... | F16F 15/023 188/267.1 |
| 2003/0010587 A1* | 1/2003 | Eroshenko | .............. | F16F 9/003 188/314 |
| 2005/0109976 A1* | 5/2005 | Fuchs | .................... | B82Y 25/00 252/62.54 |
| 2008/0296530 A1* | 12/2008 | Fuchs | .................... | B82Y 25/00 252/62.54 |
| 2012/0186003 A1* | 7/2012 | Heger | .................. | A41D 13/015 2/412 |

OTHER PUBLICATIONS

Taiwan Structural Engineering vol. 28, No. 2, Jun. 2013 pp. 84-100.

* cited by examiner

*Primary Examiner* — Robert A Siconolfi
*Assistant Examiner* — San Aung
(74) *Attorney, Agent, or Firm* — Muncy, Geissler, Olds & Lowe, P.C.

(57) ABSTRACT

A micro-nano fluid damper includes a sleeve, a piston assembly and a micro-nano fluid. The sleeve has an accommodating space. The piston assembly has a piston head and at least one piston rod. The piston assembly is movably disposed in the accommodating space. The piston rod extends out of the sleeve from a side of the piston head. The micro-nano fluid is filled between the sleeve and the piston assembly, and the micro-nano fluid flows in the accommodating space by the back-and-forth movement of the piston. When a shear strain rate of the micro-nano fluid is greater than $1s^{-1}$, an exponent of velocity of the micro-nano fluid damper is less than 1, and the micro-nano fluid has a shear thinning threshold and a shear thickening threshold.

13 Claims, 26 Drawing Sheets

| PPG micro-nano fluid | Nano particle (R972) weight percentage ratios | | |
|---|---|---|---|
| molecular weight | 7.5% | 10.0% | 12.5% |
| 400 | 0/2/4/6 | 0 | 0 |
| 1000 | 0 | 0 | 0/6 |
| 3000 | 0/6 | 0 | 0/2/4/6 |

FIG.5

| Amplitude (mm) | Frequency (Hz) | Damping force (kN) | Coefficient (kN/(mm/s)$^\alpha$) | Index. ($\alpha$) |
|---|---|---|---|---|
| 10 | 0.1 | 5.738 | 3.857 | 0.187 |
| 10 | 0.3 | 7.484 | 3.603 | 0.228 |
| 10 | 1 | 10.627 | 0.870 | 0.598 |
| 10 | 3 | 16.289 | 1.266 | 0.494 |

FIG.14

| Amplitude (mm) | Frequency (Hz) | Damping force (kN) | Coefficient (kN/(mm/s)$^\alpha$) | Index. ($\alpha$) |
|---|---|---|---|---|
| 1 | 3 | 4.546 | 4.555 | 0.136 |
| 5 | 3 | 13.199 | 1.161 | 0.591 |
| 10 | 3 | 16.289 | 1.266 | 0.494 |
| 15 | 3 | 18.597 | 1.118 | 0.521 |

FIG.15

MICRO-NANO FLUID DAMPER

BACKGROUND

1. Technical Field

The present invention relates to a damper, particularly to a damper with micro-nano fluid.

2. Related Art

The function of the conventional damper is for shock absorbing, deceleration, and energy dissipation. When an object moves, no matter linearly or rotatably, impact can be generated. The impact can directly or indirectly cause damage to the object. By installing the damper, the impact can be avoided or minimized, or the mechanical energy generated by the impact can be absorbed.

Most of the conventional dampers in the market are passive vibration dampers, which can be classified as Viscous Damper, Viscoelastic Dampers, Frictional Dampers, and Metal Dampers, etc. Each kind of dampers minimizes the impact caused by vibrating in a way of metal yielding of the damper itself, or by the viscous force of liquid or a solid.

The fluid damper using viscous force of liquid to minimize the impact caused by vibration mainly includes a hollow tubular shell filled with a working fluid, and a piston movably installed in the shell. The moving speed of the piston can be slowed down by providing damping force to the piston from the working fluid.

Another kind of damper reduces the impact by actively controlled vibration. By providing energy to the damper, the damping force and viscosity of the damper can be varied. The advantage of this kind of damper lies in that timely and effectively controlling the action of the damper by providing extra energy to the damper. However, active control consumes a lot of energy, and this kind of damper will also be out of function due to power failure. Therefore, a semi-active damper which only needs very little energy to change the material characteristic of the damper draws public attention and is under research. These kind of dampers, such as Magnetorheological Dampers, Electrorheological Dampers, etc., use magnetic field or electric field to change the arrangement of the micro-nano particle inside the damper to further change the viscosity of the fluid, thereby changing the relation of the damping force, the velocity, and the arrearage of the loop area, or using micro energy switch gate system to change the whole mechanical characteristic of the damper. However, changing the way the damper works by adjusting the electricity still has the problems of durability, voltage life and cost. In the long term, the passive controlling system will be safer and more stable considering the maintenance cost and the risk of malfunction of the electrical equipment.

The semi-active controlling damper needs to use additional electric and magnetic device, and also other related structure arranged on the damper. Therefore, the cost of this kind of damper is higher than other kinds of damper. Moreover, the electric/magnetic field generated by the electromagnetic device of the damper is not easy to be evenly distributed, and the arrangement of iron particle is not easy to be controlled either. Thus, the partial damping force of the damper cannot be controlled accurately, which further influences the damper to show the expected result.

Fluid Viscous Damper (FVD) is formed in tubular piston shape, and the hydraulic cylinder is filled with viscous fluid which flows from one side of the damper via the gap between the piston plate and the sleeve to the other side of the damper. By the characteristic that damping force is proportional to the flow velocity when the fluid flows, energy generated during the moving of the object can be absorbed by the damping force generated from the pressure difference between two sides of the piston.

The characteristic of the linear viscous damper is that when the viscosity of the fluid is higher, the damping force of the damper will become larger. The energy that the damper consumes will be transformed into thermal energy. Thus, when the temperature of the fluid rises, the viscosity of the fluid gets low.

The conventional damper structure has ball bearings installed on the piston head to reduce friction between the piston head and the interior surfaces of the tube, thereby improving the lifetime of the damper and lowering the repairing frequency. Moreover, when the piston is pushed by the pressure differences between two sides of the piston, the flow opening between the piston head and the tube sleeve can be adjusted to regulate the damping force of the damper, and the user can also control the controlling rod to adjust the relative position of the throttling element and the pushing rod. By doing so, the damping force of the damper can be regulated.

However, except the improvement of the piston and the sleeve related elements, the fluid characteristic for the whole system can also be an important influential factor. The damper system will have higher wear and damping force if using high polymer material with high viscosity, so the fluid damper in a whole still has room for improvement.

BRIEF SUMMARY

The present invention provides a micro-nano fluid damper, which can absorb and transform the vibration to thermal energy to be dissipated, and effectively enhances the viscosity and thermal conduction of the micro-nano fluid, thereby having better result of impact absorption.

The present invention provides a micro-nano fluid damper. The micro-nano fluid damper includes a sleeve, a piston assembly and a micro-nano fluid. The sleeve has an accommodating space. The piston assembly has a piston head and at least one piston rod. The piston assembly is movably disposed in the accommodating space. The piston rod extends out of the sleeve from a side of the piston head. The micro-nano fluid is filled between the sleeve and the piston assembly, and the micro-nano fluid flows in the accommodating space by the back-and-forth movement of the piston. When a shear strain rate of the micro-nano fluid is greater than $1\ s^{-1}$, an exponent of velocity of the micro-nano fluid damper is less than 1, and the micro-nano fluid has a shear thinning threshold and a shear thickening threshold.

The present invention also provides a micro-nano fluid damper. When the shear strain rate is smaller than the shear thinning threshold, the viscosity of the micro-nano fluid decreases with the increasing of the shear strain rate.

The present invention also provides a micro-nano fluid damper. When the shear strain rate is larger than the shear thinning threshold and smaller than the shear thickening threshold, the viscosity of the micro-nano fluid increases with the increasing of the shear strain rate.

The present invention also provides a micro-nano fluid damper. When the shear strain rate is larger than the shear thickening threshold, the viscosity of the micro-nano fluid decreases with the increasing of the shear strain rate.

The present invention also provides a micro-nano fluid damper. The micro-nano fluid includes a basic fluid and a plurality of suspended particles. The basic fluid is a polymer fluid, and the suspended particles are hydrophobic particles.

The present invention also provides a micro-nano fluid damper, and the suspended particles are up to 50% of the amount of the micro-nano fluid.

The present invention also provides a micro-nano fluid damper, and the diameter of the suspended particle is smaller than 1 micrometer.

The present invention also provides a micro-nano fluid damper, and the suspended particles include a plurality of oxide particles, inorganic compound particles, or polymer particles.

The present invention also provides a micro-nano fluid damper. The piston assembly has two piston rods extending out of the sleeve from two sides of the piston head, respectively.

The present invention also provides a micro-nano fluid damper. A ring gap is provided between the piston head and the inner side of the sleeve, and the micro-nano fluid flows in the accommodating space through the ring gap.

The present invention also provides a micro-nano fluid damper. The piston head has at least one hole (orifice), and the micro-nano fluid can flow in the accommodating space through the at least one hole (orifice).

The present invention also provides a micro-nano fluid damper. A ring gap is provided between the piston head and the inner side of the sleeve, and the piston has at least one hole (orifice). The micro-nano fluid can flow in the accommodating space through the ring gap and the at least one hole (orifice).

For those described above, the micro-nano fluid damper according to the present invention has better impact absorption effect by filling a fluid containing micro-nano particle to effectively enhance the viscosity of the fluid and the damping force of the damper.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a rheology testing chart according to the present invention;

FIG. 14 is a table showing the damping coefficient and damping index of damping force under different outer force for the micro-nano fluid damper according to the present invention;

FIG. 15 is another table showing the damping coefficient and damping index of damping force under different outer force for the micro-nano fluid damper according to the present invention;

DETAILED DESCRIPTION

Figure 1:
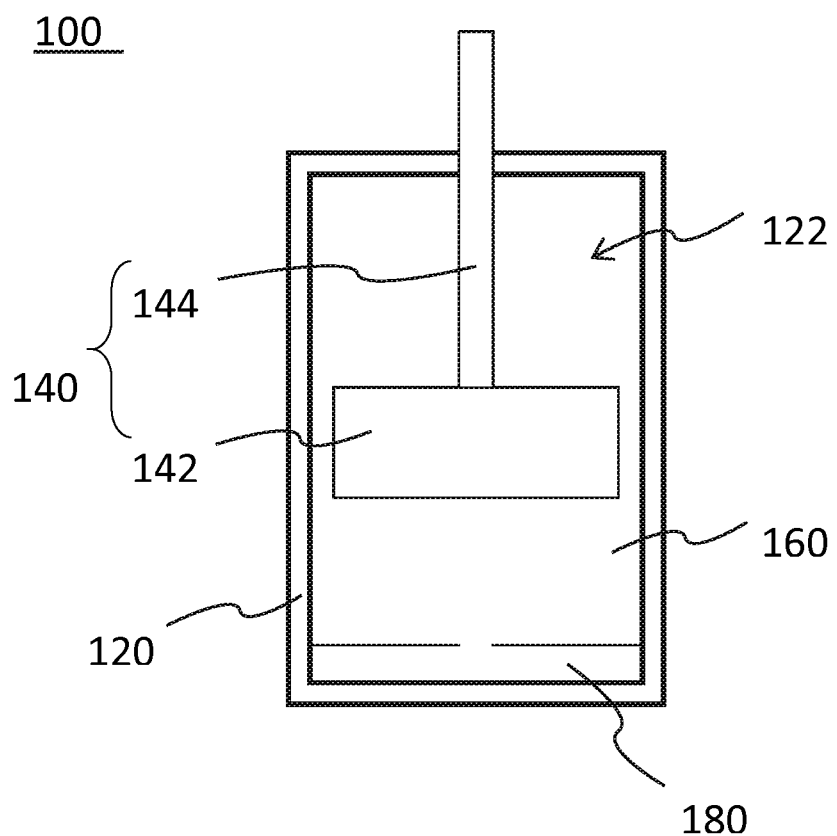
FIG. 1 is a schematic view of the micro-nano fluid damper according to the present invention.

Please refer to FIG. 1, a micro-nano fluid damper 100 includes a sleeve 120, a piston assembly 140, and a micro-nano fluid 160 filled in the sleeve 120.

Specifically, the sleeve 120 has an accommodating space 122, and the piston assembly 140 includes a piston head 142 and at least one piston rod 144. The piston assembly 140 can movably be disposed in the accommodating space 122. The piston rod 144 extends out of the sleeve 120 from on side of the piston head 142. The micro-nano fluid 160 is filled between the sleeve 120 and the piston assembly 140. The micro-nano fluid 160 moves back and forth in the accommodating space 122 corresponding to the piston head 142. When a shear strain rate of the micro-nano fluid 160 is greater than $1 \text{ s}^{-1}$, an exponent of velocity of the micro-nano fluid damper 100 is less than 1, and the micro-nano fluid 160 has a shear thinning threshold and a shear thickening threshold. The micro-nano fluid damper 100 in the preferred embodiment of the present invention further includes an air chamber 180. The air chamber 180 is used for releasing pressure in the accommodating space 122.

Figure 2:
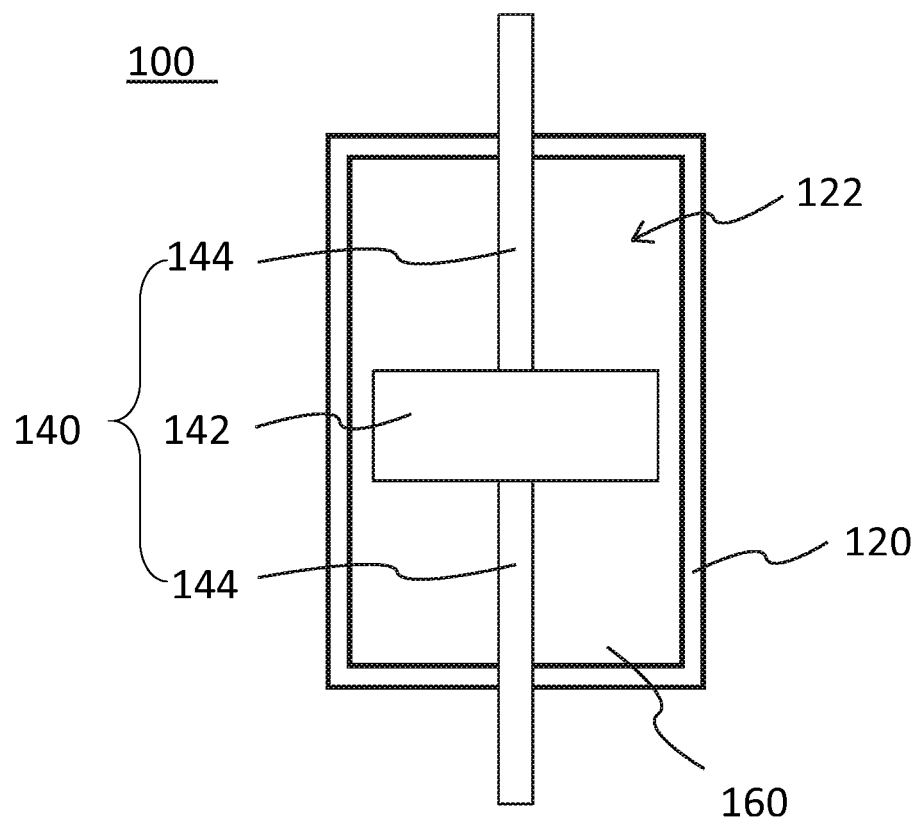
FIG. 2 is a schematic view of the piston assembly of the micro-nano fluid damper according to the present invention.

Please refer to FIG. 2, the micro-nano fluid damper 100 further includes a piston head 142 and two piston rods 144.

The two piston rods 144 extend out of the sleeve 120 from two sides of the piston head 142, respectively.

Figure 3:
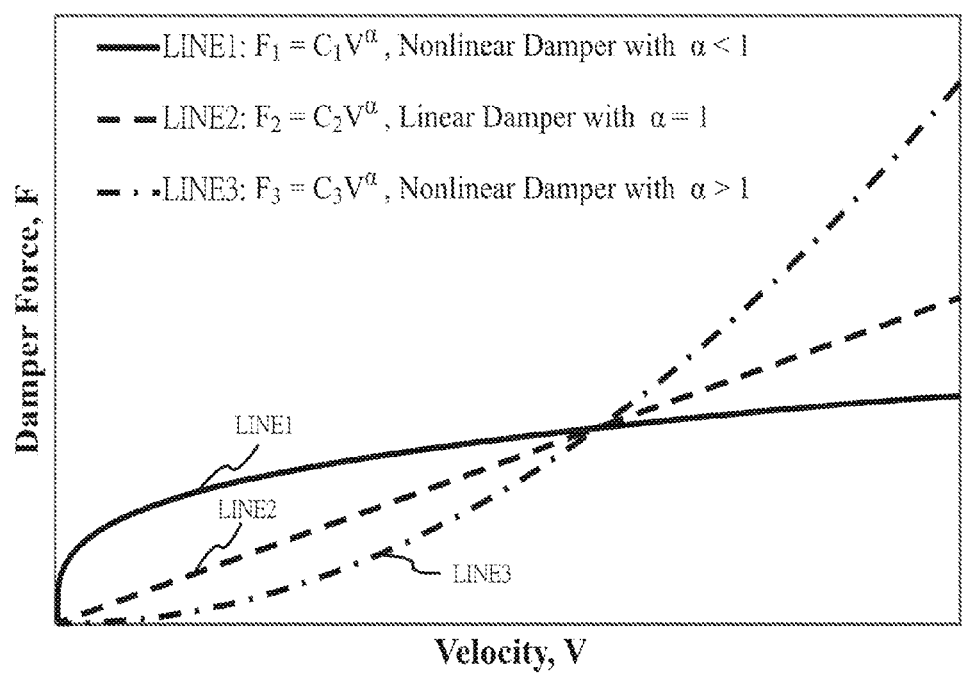
FIG. 3 is a diagram showing the relationship of vibration speed and the damping force of the micro-nano fluid damper according to the present invention.

Please refer to FIG. 3, when outer force pushes the piston rod 144, the piston head 142 will move in the accommodating space 122 according to the outer force. Meanwhile, a shear force will be generated between the piston head 142 and the micro-nano fluid 160. When the micro-nano fluid 160 receives the shear force, a damping force will be generated due to the viscous characteristic of the micro-nano fluid 160. The theoretical formula of the damping force is shown as follows:

$$F = C|V|^\alpha \text{sgn}(V)$$

In the aforementioned formula, F is the damping force; V is the vibration speed; C is the coefficient of damping. α decides the relationship of the damping force and the vibration speed. Therefore, the vibration speed V of the piston assembly 140 and the coefficient of the damping C can affect the power of damping force.

In other words, the micro-nano fluid damper 100 should be customized according to the vibration speed (V) and the energy dissipating demand (C, α) of the target object (FIG. not shown). The performance of the micro-nano fluid damper 100 mainly be distinguished to linear damper (α=1) and non-linear damper (α>1 or α<1) according to the demand.

In addition, when the micro-nano fluid damper 100 is a non-linear damper, and α>1: (1) if the vibration speed of the piston assembly 140 is low, it shows that there is no obvious damping force to be generated. At this time, the response for the vibration speed of the object is low, and the efficiency of the energy dissipating is low as well; (2) if the vibration speed of the piston assembly 140 is high, more damping force 140 will be generated. Thus, if the vibration speed of the piston assembly 140 exceeds the predetermined range of the vibration speed, the object will be damaged due to the high damping force generated by the fluid. Therefore, in the condition α>1, the micro-nano fluid damper 100 is seldom used for impact absorption for the object.

When the micro-nano fluid damper 100 is a non-linear damper, and α<1: (1) if the vibration speed of the piston assembly 140 is low, significant damping force will be generated. Thus, when the response for the vibration speed of the object is low, the impact energy can be efficiently dissipated to protect the object; (2) if the vibration speed of the piston assembly 140 is high, the increasing of the damping force will not be big. Thus, if the vibration speed of the piston assembly 140 exceeds the predetermined range of the vibration speed, the object will not be damaged since the damping force generated by the fluid is low. Therefore, the present invention uses the micro-nano fluid damper 100 with α<1, which is more suitable for being used in impact absorption.

Moreover, the micro-nano fluid 160 of the micro-nano fluid damper 100 according to the present invention includes a basic fluid 162 and a plurality of suspended particles 164, the basic fluid 162 can be a high polymer fluid, and the suspended particles 164 can be hydrophobic particles. Besides, the suspended particles 164 are up to 50% of the amount of the micro-nano fluid 160, and the diameter of the suspended particles 164 should be less than 1 micrometer. The suspended particles 164 include oxide particles, inorganic compound particles, or polymer particles, but not limited thereto. In addition, please refer to FIG. 4, when the micro-nano fluid 160 receives a shear force, the viscosity of the micro-nano fluid 160 will rapidly rise, and the micro-nano fluid 160 is used for absorbing the little vibration of the object to achieve the effect of energy dissipation. The impact absorption effect is achieved by the high polymer with colloidal particle in the micro-nano fluid 160.

Moreover, the cause of the shear thickening effect of the micro-nano fluid 160 is hydrocluster. Hydrocluster happens when the the micro-nano fluid 160 receives the shear force, and each of the high polymer molecules are forced to close to each other. When the high polymer molecules close to each other, the intermolecular attraction will become stronger, which makes the high polymer molecules even closer to each other, and the viscosity of the micro-nano fluid 160 can increase significantly. Furthermore, the more shear force the micro-nano fluid 160 receives, the more aggregation the colloidal particles do, and the viscosity of the micro-nano fluid 160 will be higher. In the contrast, when the shear force received by the micro-nano fluid 160 decreases, the aggregation of the colloidal particles will decrease accordingly, and the viscosity of the micro-nano fluid 160 will decrease as well. Thus, the hydrocluster is a reversible reaction. Specifically, the shear thickening effect of the micro-nano fluid does not unlimitedly increase by the increasing of the shear force. When the shear force reaches a certain threshold, the shear force is larger than the aggregation force among the molecules, and the aggregated colloidal particles will be separated. At this time, the viscosity of the fluid will decrease by the increasing of the shear force.

Figure 4:
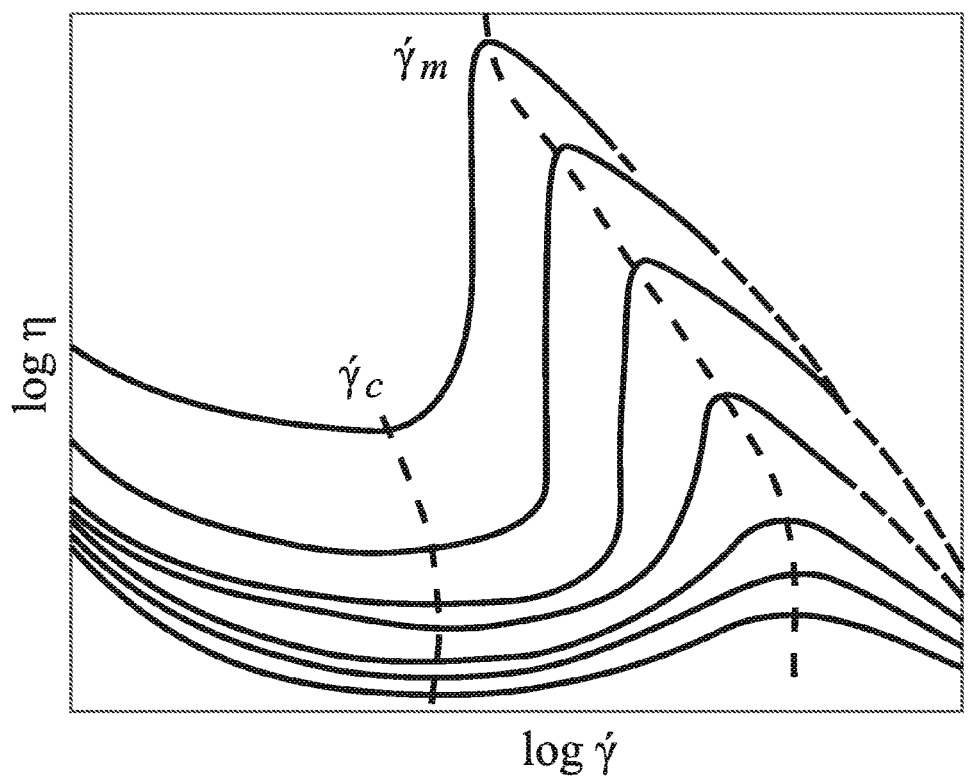
FIG. 4 is a diagram showing the relationship of viscosity of the micro-nano fluid and the shear strain rate according to the present invention.

Please refer to FIG. 4, the $\gamma_c$ is the threshold of the shear thinning effect, $\gamma_m$ is the threshold of the shear thickening effect. When the shear strain rate is smaller than the threshold $\gamma_c$, the viscosity of the micro-nano fluid 160 will become thinner according to the increasing of the shear strain rate. When the shear strain rate reaches the threshold $\gamma_c$ and smaller than $\gamma_m$, the viscosity of the micro-nano fluid 160 will become thicker according to the increasing of the shear strain rate. Therefore, a sharply rising curve will be shown, which is called the shear thickening effect. When the shear strain rate reaches the threshold $\gamma_m$, the viscosity of the micro-nano fluid 160 will become thinner according to the increasing of the shear strain rate. Therefore, a slowly decline curve will be shown, which is called the shear thinning effect. For those mentioned above, the liquid having the shear thinning and thickening effect is not a Newtonian fluid that has a constant liquid viscosity. If the micro-nano fluid 160 is filled in the conventional damper, the coefficient of damping will change due to the uneven force applied to the damper or the differences of the vibration speed. Therefore, the coefficient of damping will no longer be a constant value.

In the present invention, the nano grade hydrophobic $SiO_2$ particles are added into the polar fluid to make a Non-Newtonian fluid with micro-nano particles, and a rheological test is applied to the micro-nano fluid.

Please refer to FIG. 5, the basic fluid 162 of the micro-nano fluid 160 can be Polypropylene Glyco (PPG), and the suspended particles 164 can be $SiO_2$ nano particle (R972). The PPG is a polar fluid having molecular weight 400 g/mol, 1000 g/mol, and 3000 g/mol. The diameter of the $SiO_2$ nano particles are 12 nanometer, and the $SiO_2$ nano particles are hydrophobic. Specifically, in the present invention, 50% of the hydroxyl groups on the surfaces of $SiO_2$ nano particles are displaced with alkyl groups. By doing so, the bonding ability among all the $SiO_2$ nano particles are greater than the bonding ability between the $SiO_2$ nano particles and the PPG. In order to have the shear thickening effect for the basic fluid 162 and the suspended particles 164 of the micro-nano fluid 160, and the suspended particles 164 can form stable viscosity with the basic fluid 162 when the shear thinning effect applied, the suspended particles 164 and the basic fluid 162 of the present invention are fixed in weight percentage ratios of 7.5%, 10%, and 12.5%.

In a preferred embodiment of the present invention, a micro-nano fluid rheological test is applied. The rheological test instrument used in this experiment is a strain controlled rheometer (AR2000ex). The strain controlled rheometer uses TA advantage software version 4.0 to control the Cone and Plate measuring kit, which can measure the rheological properties of shear strain rate of the steady state 0-4000 $s^{-1}$ and dynamic test frequency 0.1 Hz-5 Hz, amplitudes 0-1000%. Steady state test and dynamic test will be applied. The steady state uses fixed shear strain rate $\gamma$ to perform the test. The tested shear strain rate is in the range of 0-1000 $s^{-1}$, and the test result is viscosity. The dynamic test fixes test frequency and changes amplitude $\gamma$. The test frequencies are 0.5, 1.0, 3.0 Hz. The test amplitude range is 0~100%, and the test result is complex viscosity.

Figure 6A:
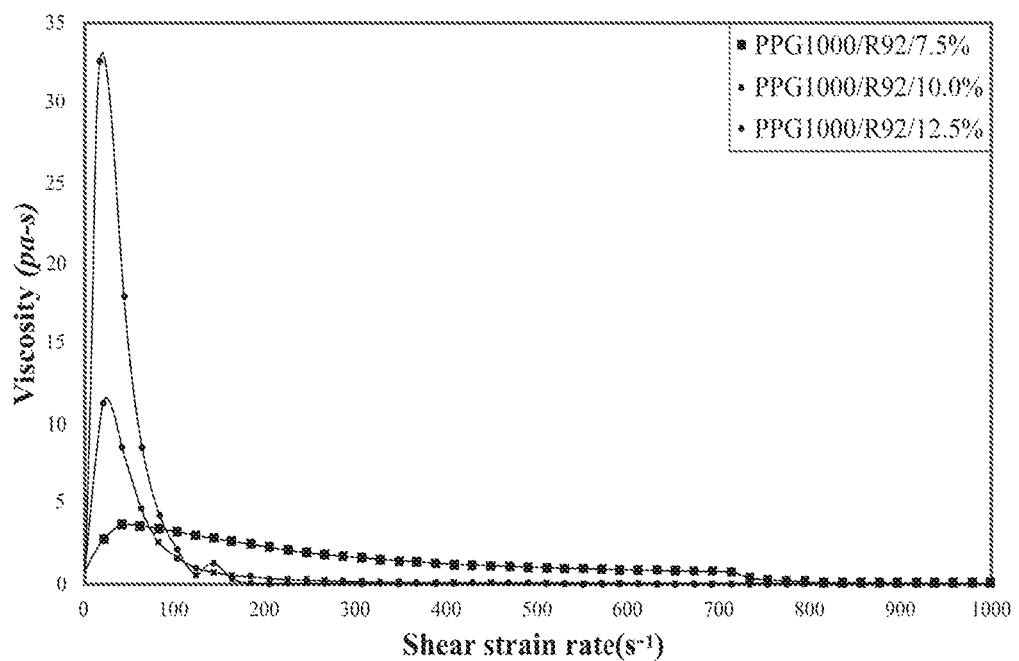
FIG. 6A is a steady state test result according to the present invention.
Figure 6B:
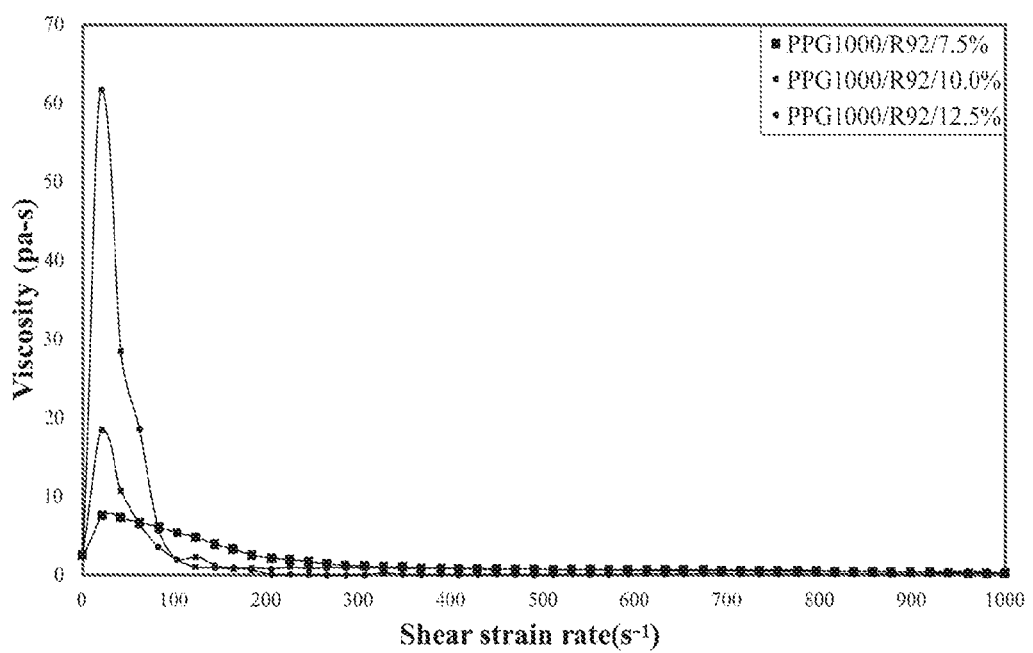
FIG. 6B is another steady state test result according to the present invention.

In addition, please refer to FIGS. 6A and 6B, the experiment result shows: (1) the viscosity rises by the increasing concentration of PPG; (2) the viscosity raises by the increasing molecular weight of PPG; (3) when the shear thickening effect happens, the micro-nano fluid with different mixed concentration will recover to the basic fluid concentration; (4) the shear strain rate for the end of the shear thickening effect has no significant differences among all kinds of mixed fluids, but has a tendency to rise by the concentration going down. The main reason is, when the shear thickening effect happens, each of the suspended particles 164 close to each other form a colloidal group. When reaching the end of the shear thickening effect, the colloidal group of the suspended particles 164 will be broke and back to the dispersion state, thereby generating shear thinning effect.

Figure 7A:
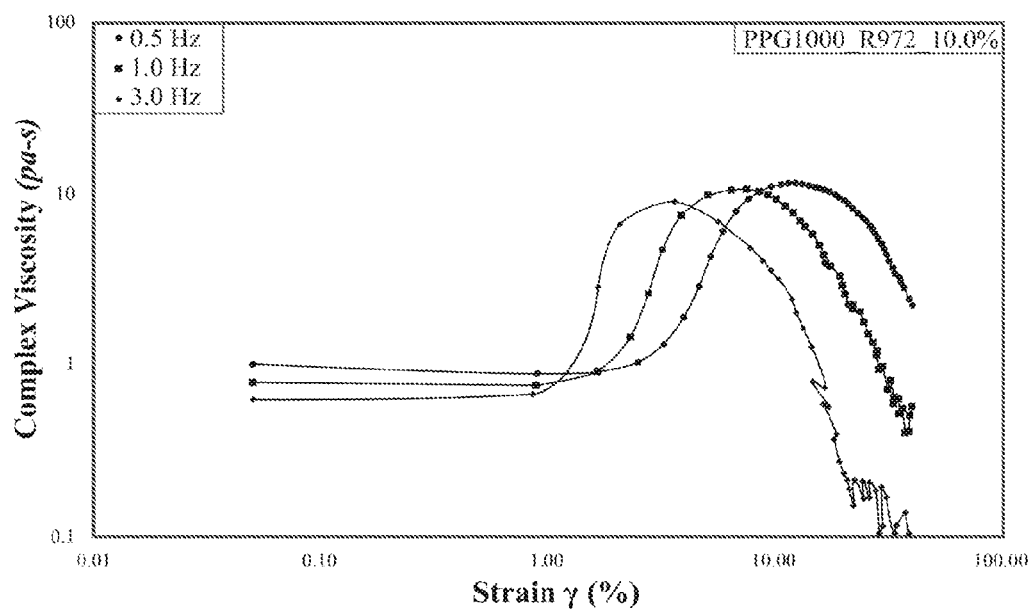
FIG. 7A is a dynamics test result according to the present invention.
Figure 7B:
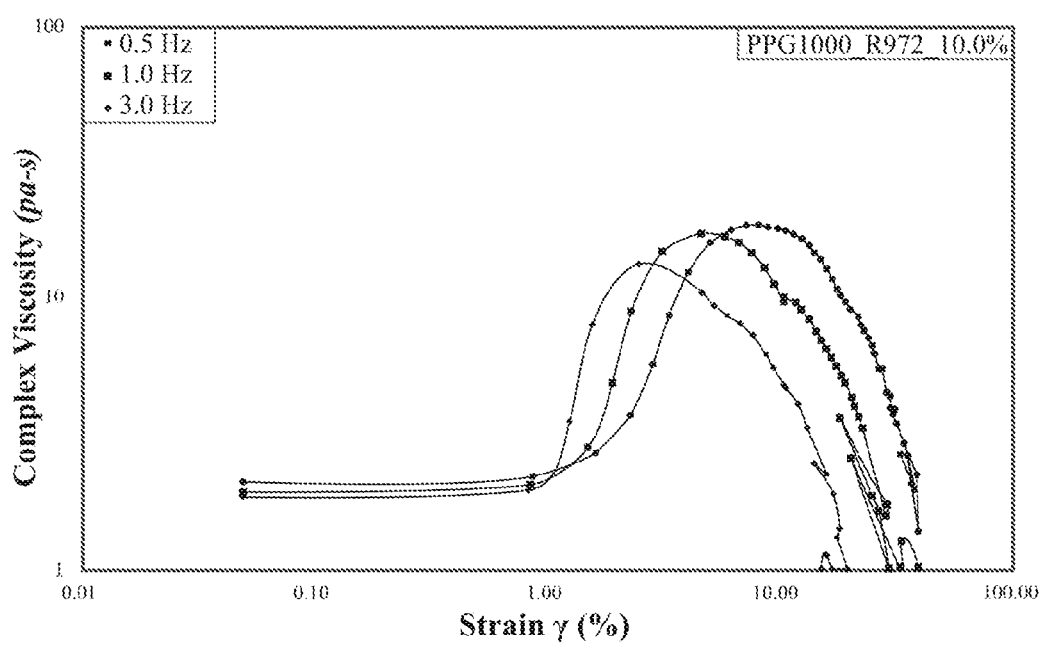
FIG. 7B is another dynamics test result according to the present invention.

Moreover, please refer to FIGS. 7A and 7B, the experiment result shows: (1) With the higher vibration frequency, the shear strain rate gets low when the shear thinning effect happens; (2) the fewer suspended particles 164 the micro-nano fluid 160 has, the higher shear strain rate is shown when the shear thinning effect happens; (3) the lower molecular weight the PPG has, the higher shear strain rate is shown when the shear thinning effect happens. There are two main reasons: (1) under the same PPG, the more suspended particles 164 exist, the easier the suspended particles 164 form colloidal group to reach the end of the shear thickening effect earlier; (2) under the same amount of suspended particles 164, the more molecular weight of PPG, the easier the aggregated suspended particles 164 broken down by the binding strength of the PPG. Therefore, the shear strain rate gets lower.

In order to know if the dispersion of the basic liquid 162 after being agitated several times is reversible, the micro-nano fluid is mixed twice by a three roller dispersion analyzer, and the mixed fluid is stored for 3 months to perform the same rheological test. The procedure above will be performed 0-6 times. Besides, for the same micro-nano fluid 160, 4 consecutive times rheological test will be applied to observe the variation of the rheological characteristic.

Figure 8:
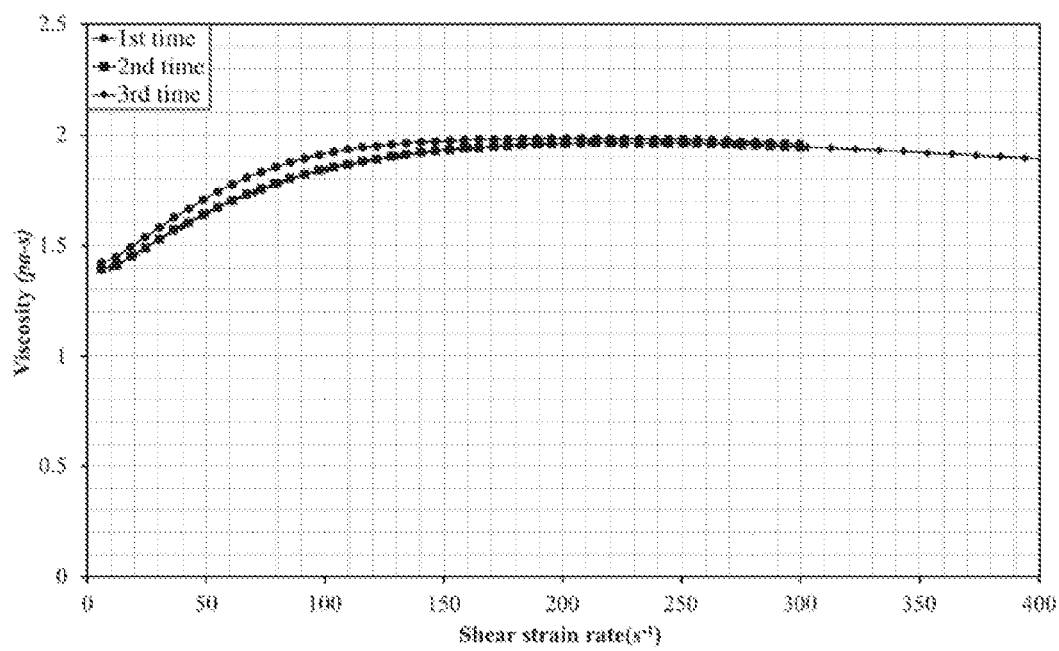
FIG. 8 is a continuous steady state test result according to the present invention.
Figure 9A:
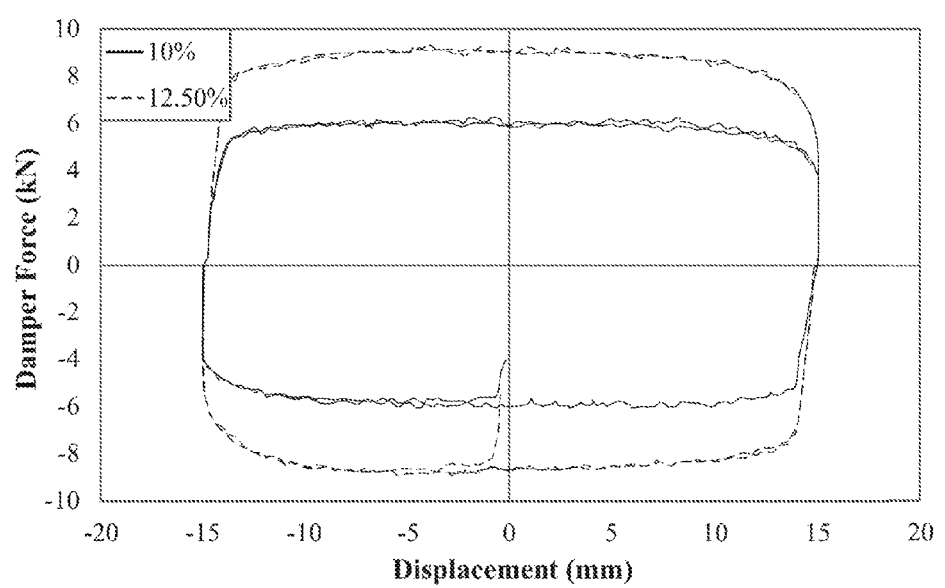
FIG. 9A is a testing record of the micro-nano fluid damper with 10 percentage by weight of micro-nano fluid and 12.5 percentage by weight micro-nano fluid according to the present invention.
Figure 9B:
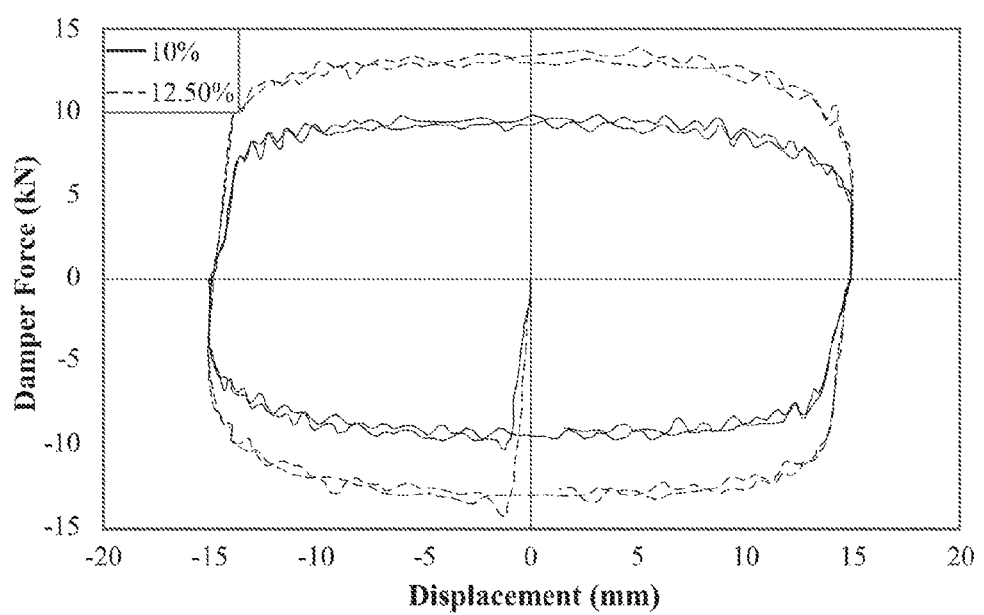
FIG. 9B is another testing record of the micro-nano fluid damper with 10 percentage by weight of micro-nano fluid and 12.5 percentage by weight micro-nano fluid according to the present invention.

Please refer to FIG. 8, after doing the experiment on the micro-nano fluid 160 for many times, the viscosity will decrease by the breaking down degree of the colloidal group. Therefore, no matter how many times the micro-nano fluid 160 is tested, the micro-nano fluid 160 can still recover back to the original state after 3 months storage.

Moreover, the suspended particles 164 used in this invention is $SiO_2$ nano particles (R972) with 12 nm diameter. The basic fluid 162 used in this invention is PPG. After the rheological test, the result shows: (1) The viscosity ranging from 0.5 to 62 Pa·s is provided by the weight percentage and the amount of the suspended particles 164; (2) the critical shear strain rate ranging from 15 to 50 $s^{-1}$ is provided by the percentage and the amount of the suspended particles 164; (3) Under the test condition of dynamic frequency 0.5 Hz~5.0 Hz, the shear thickening effect and the shear thinning effect happen at the shear strain rate 5%~15%. Those experiment data can be used for developing the micro-nano fluid damper 100.

Please refer to FIGS. 9-13. In FIGS. 9A and 9B, it can be known from testing the shape of the hysteresis loops that the micro-nano fluid damper 100 is a non-linear damper, and $\alpha<1$. Thus, the energy dissipating effect of the magnetic fluid damper ($\alpha<1$) can be achieved without changing the structure of the micro-nano fluid damper 100. In other words, merely changing the concentration of the micro-nano fluid 160 of the present invention can change the damping force. Besides, the damping force gets stronger by the raising of the micro-nano fluid concentration. For those described above, after the micro-nano fluid 160 being agitated by the shear force, each of the suspended particles 164 attracts each other to recover to the state before the agitation.

Figure 10:
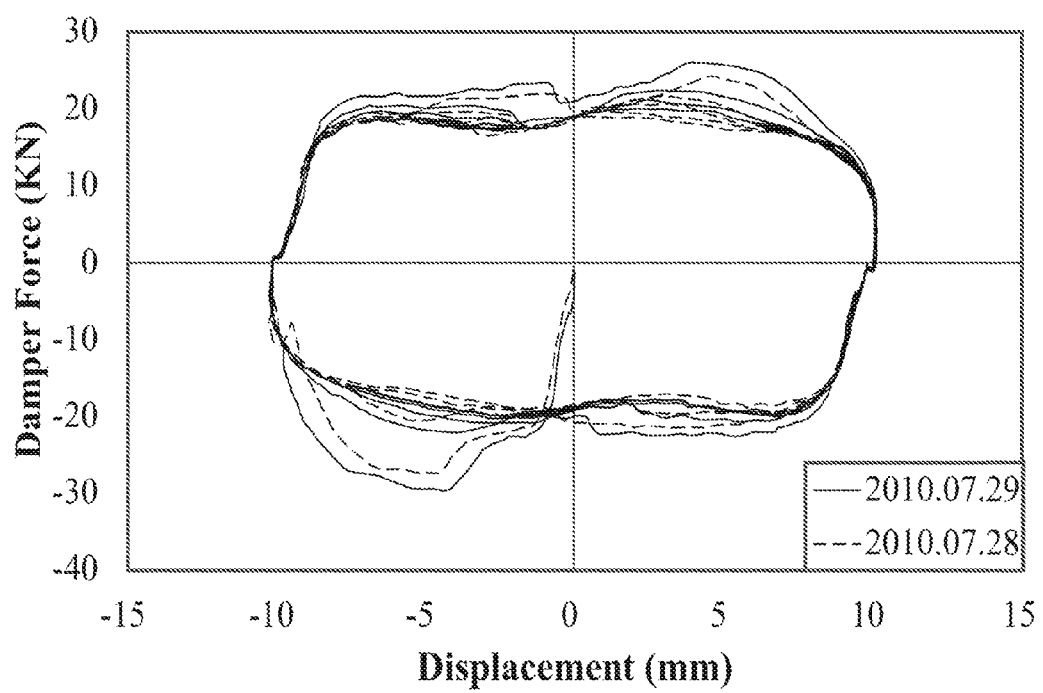
FIG. 10 is a diagram showing the repeat test of filling the micro-nano fluid according to the present invention.
Figure 11A:
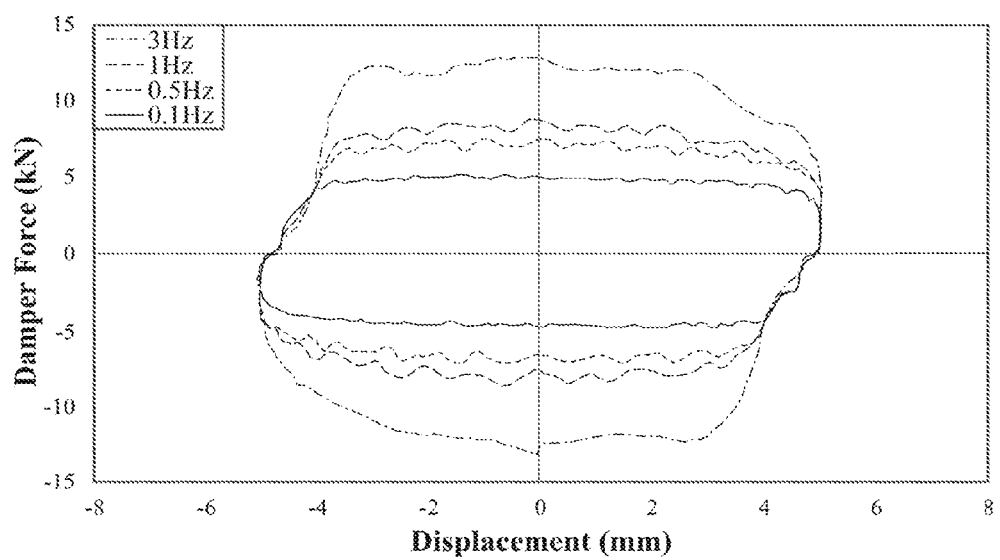
FIG. 11A is a performance test result of the micro-nano damper filled with 10% micro-nano fluid under 0.1 Hz-3 Hz (5 mm stroke) according to the present invention.
Figure 11B:
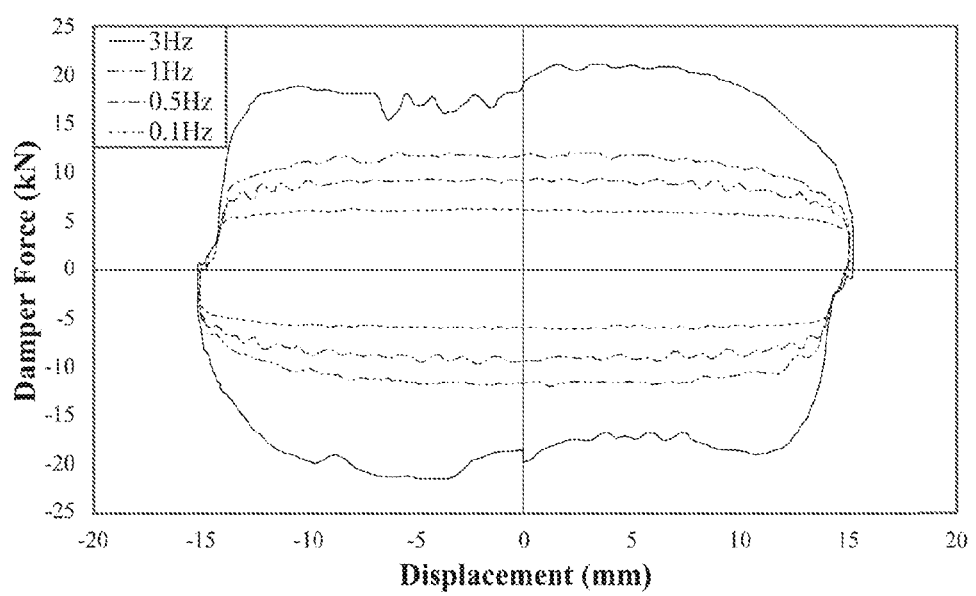
FIG. 11B is another performance test result of the micro-nano damper filled with 10% micro-nano fluid under 0.1 Hz-3 Hz (15 mm stroke) according to the present invention.

FIG. 10 shows the repeat test of filling the micro-nano fluid 160. After the previous experiment, the micro-nano fluid damper 100 is tested after two days, the test result shows the same hysteresis loop, which means the liquid is reversible after the agitation. As shown in FIGS. 11A and 11B, under the condition of same amplitude and different test frequency, the hysteresis loop will change the energy dissipating due to the characteristic of the filled micro-nano fluid. The lower the frequency is, the flatter the hysteresis loop will be. Also, the higher the frequency is, the taller and narrower the hysteresis loop will be. Thus, the shear strain rate and the hysteresis loop can influence the damping force.

Figure 12A:
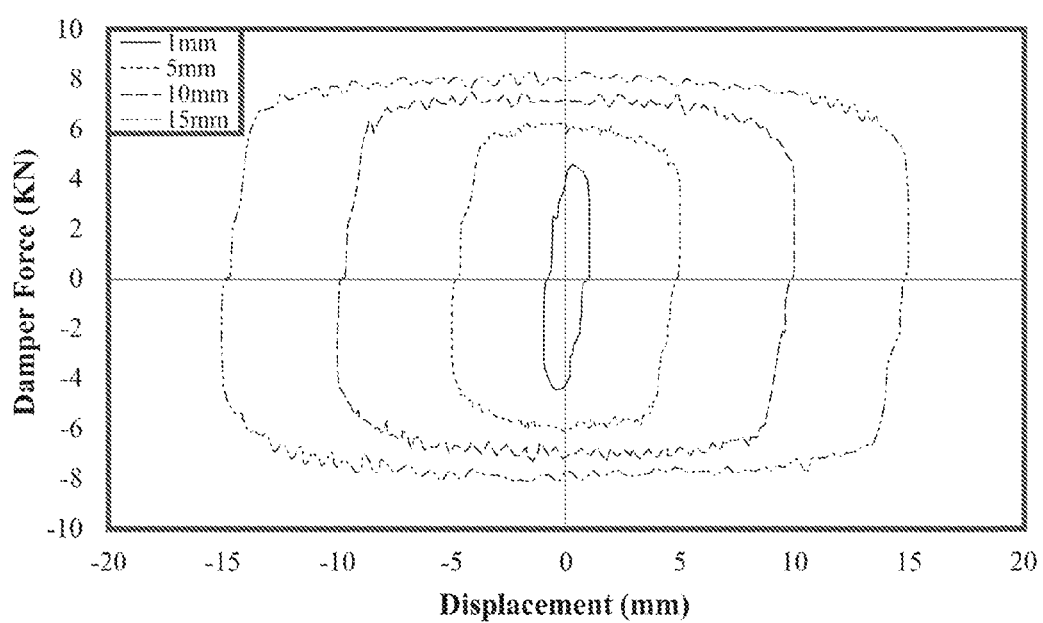
FIG. 12A is a performance test result of the micro-nano damper filled with 10% micro-nano fluid under 1 mm-15 mm stroke (0.3 Hz) according to the present invention.
Figure 12B:
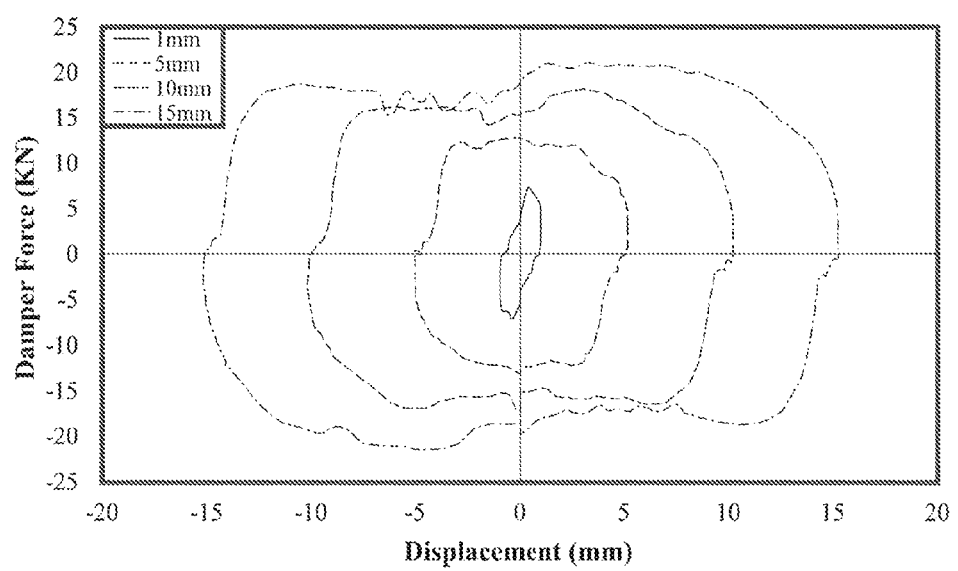
FIG. 12B is a performance test result of the micro-nano damper filled with 10% micro-nano fluid under 1 mm-15 mm stroke (3 Hz) according to the present invention.

As shown in FIGS. 12A and 12B, under the condition of same frequency and different test amplitude, the hysteresis loop will change the energy dissipating due to the characteristic of the filled micro-nano fluid. The smaller the amplitude is, the flatter the hysteresis loop will be. Also, the larger the amplitude is, the taller and narrower the hysteresis loop will be. Thus, the shear strain rate and the hysteresis loop can influence the damping force.

Figure 13:
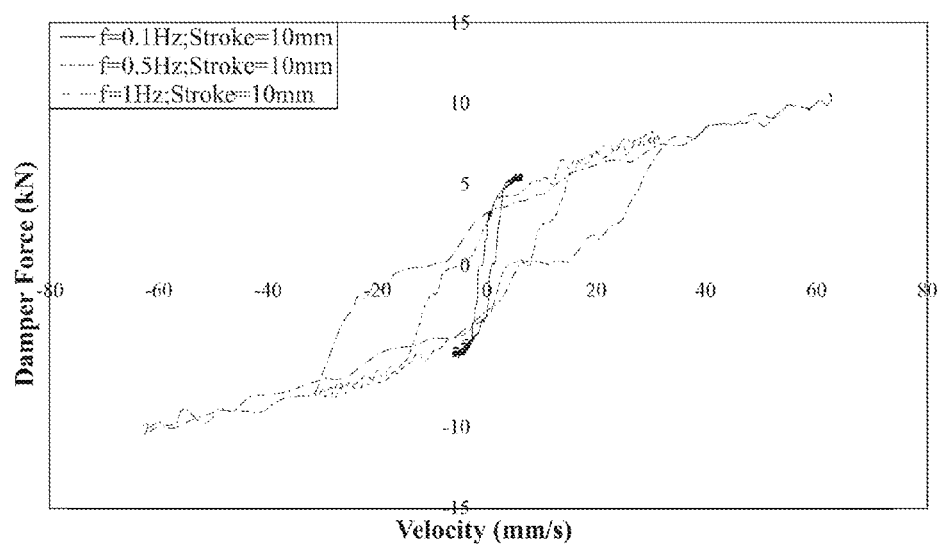
FIG. 13 is a diagram showing the relationship of vibration speed and the damping force of the micro-nano fluid damper according to the present invention.

At last, collecting all the test results from FIGS. 11A, 11B, 12A, and 12B to do the regression analysis, and the coefficient of damping C and index of damping $\alpha$ will be obtained. FIG. 13 is a diagram showing the relationship of vibration speed and the damping force. As shown in FIG. 13, when the amplitude is the same, the damping force is related to the frequency, and the characteristic $\alpha<1$ exists. As shown in FIGS. 14 and 15, the micro-nano fluid damper 100 provides different damping coefficient and damping index. Therefore, the micro-nano fluid damper 100 can be a damping-adjustable damper as demand.

Figure 16A:
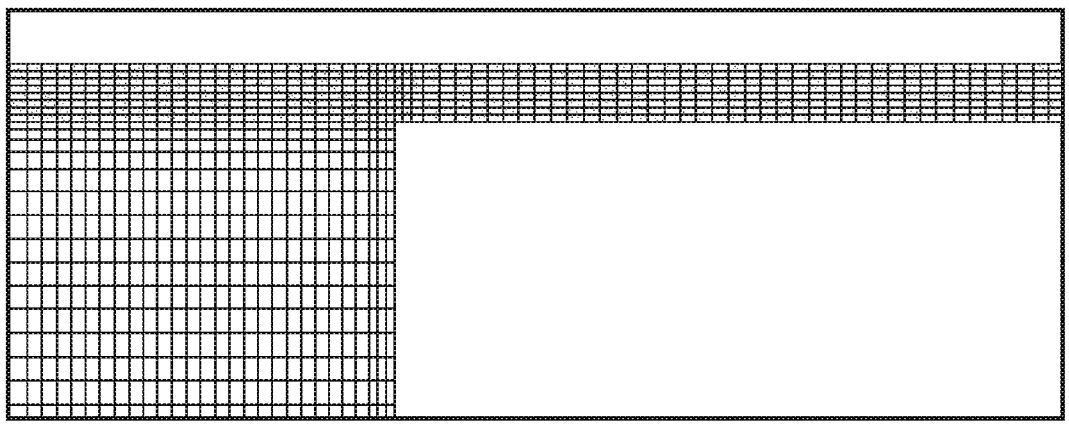
FIG. 16A is a meshing result according to the present invention.
Figure 16B:
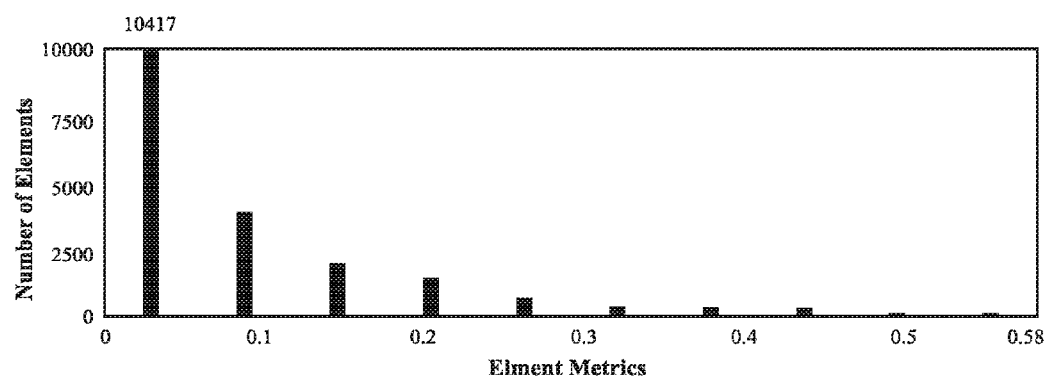
FIG. 16B is a diagram showing the distribution of the meshing quality according to the present invention.

Moreover, please refer to FIGS. 16A and 16B. The hydraulic pipe has a smaller hole, and the mesh deformation of the fluid near the wall of the piston head 142 will show when the piston head 142 and the piston rod 144 do the piston movement. In order to minimize the size differences of the meshes, the mesh distribution will be set into five parts: (1) the whole mesh size; (2) dividing the mesh grid along the porosity interval mesh grid; (3) the zone where big mesh deformation happens when doing the piston movement; (4) the amount of mesh grids of low flowing zone; and (5) the mesh grids gradually connect the intersection of the low flowing zone and high flowing zone.

Figure 17:
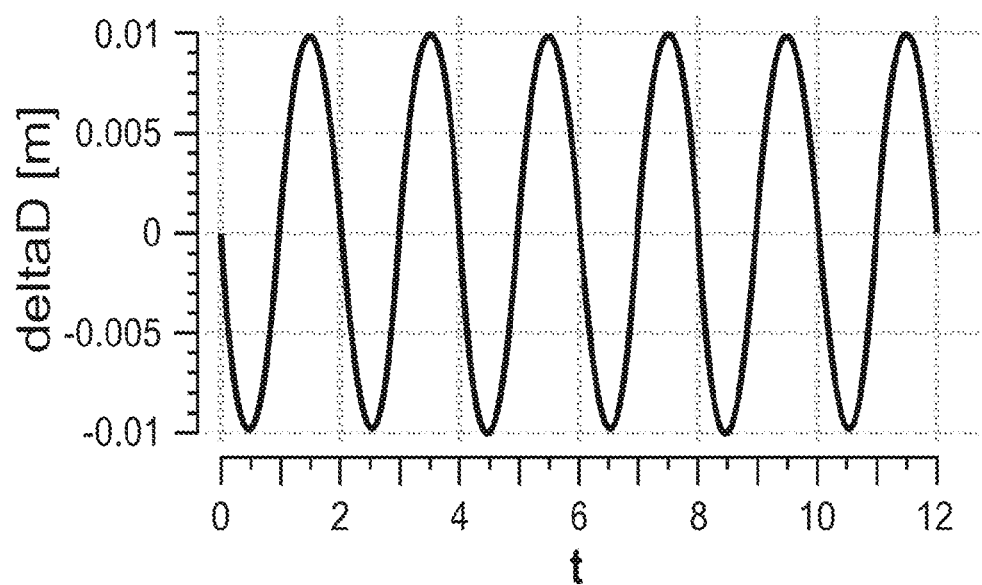
FIG. 17 is a setting diagram of sinusoidal displacement function according to the present invention.

In addition, please refer to FIG. 17, when designing the micro-nano fluid damper 100, the action that vibration characteristic of the piston assembly 140 applies to the micro-nano fluid 160 is put into consideration. Based on the characteristic of the sinusoidal displacement wave of the piston assembly 140: $\Delta*\mathrm{Sin}(\omega t)$, the piston stroke $\Delta$ is 10 mm; the piston frequency $\omega$ is 0.5 Hz; t is the piston action time, the changing of the micro-nano fluid 160 when the piston assembly 140 is in motion is clear. The above rheological test result is set in ANSYS CFX-Pre in a way of discretization. It is assumed that the fluid density of this test is a fixed value, which is 1.02 g/cm$^3$. The range of the fluid viscosity is 1.47~32.55 Pa s.

At last, this present embodiment is applied to the micro-nano fluid damper 100 of the present invention. Thus, the structure of the micro-nano fluid damper 100 does not repeatedly describe herein.

Figure 18:
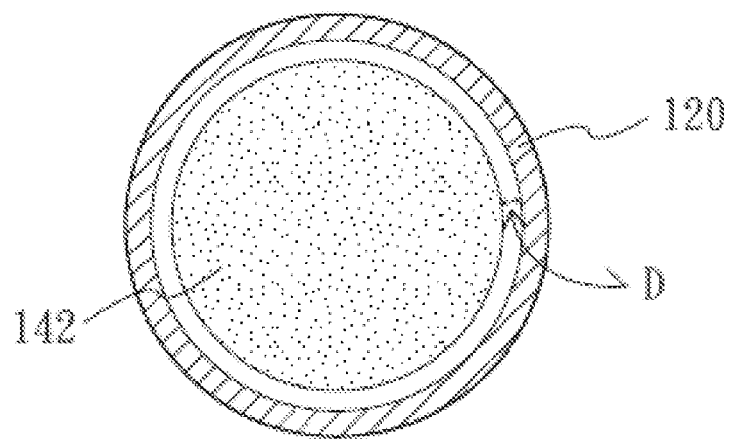
FIG. 18 is a structural diagram of the piston head according to the present invention.
Figure 19:
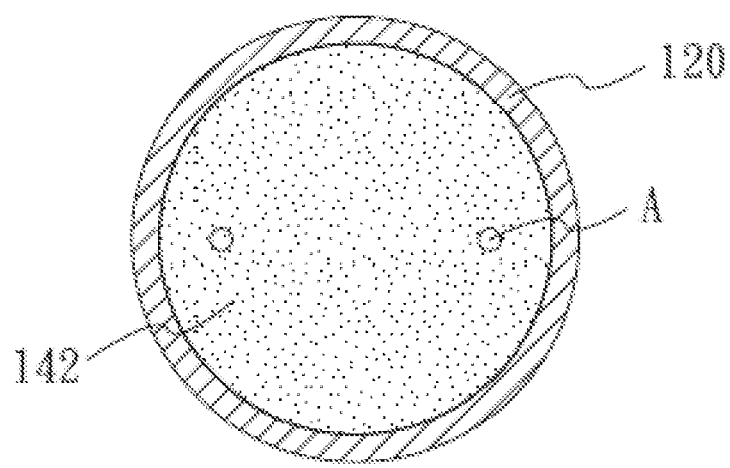
FIG. 19 is another structural diagram of the piston head according to the present invention.
Figure 20:
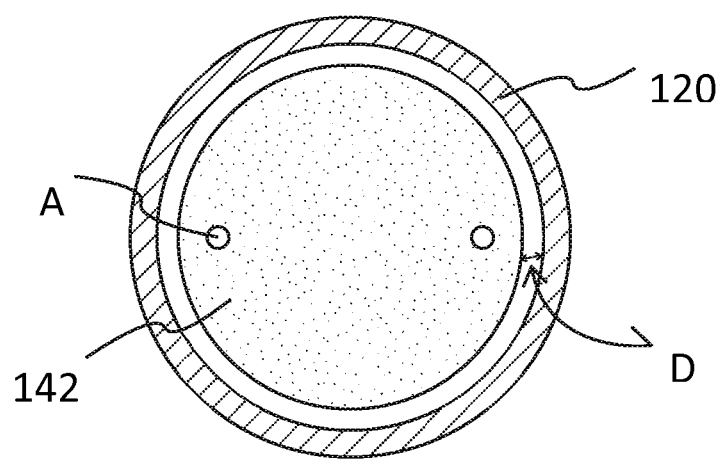
FIG. 20 is still another structural diagram of the piston head according to the present invention.

Please refer to FIGS. 18-20, there is a ring gap D existed between the outer side of the piston head 142 and the inner side of the sleeve 120. When the piston head 142 moves in the accommodating space 122 of the sleeve 120, the micro-nano fluid 160 moves through the ring gap D in the accommodating space 122 corresponding to the piston head 142.

As shown in FIG. 19, the piston head 142 has at least one hole (orifice) A. When the piston head 142 moves in the accommodating space 122 of the sleeve 120, the micro-nano fluid 160 moves through the at least one hole (orifice) A on the piston head 142 in the accommodating space 122 corresponding to the piston head 142.

As shown in FIG. 20, a ring gap D is provided between the outer side of the piston head 142 and the inner side of the sleeve 120, and the piston head 142 has at least one hole (orifice) A. The micro-nano fluid 160 flows in the accommodating space 122 through the ring gap D and the at least one hole (orifice) A corresponding to the piston head 142.

By the structure described above, better impact absorption effect can be achieved by using the viscosity and thermal conduction of the micro-nano fluid 160 to moderately influence the action speed of the piston assembly 140.

At last, when both ends of the piston assembly 140 are pushed by outer force, the piston head 142 in the accommodating space 122 of the sleeve 120 will shift toward left according to the outer force applied on the piston rod 144. The micro-nano fluid 160 will flow toward right of the accommodating space 122 of the sleeve 120 relatively according to the moving of the piston head 142. Meanwhile, the work generated by the linear movement of the piston assembly 140 will be transformed into two types: first, when the micro-nano fluid 160 is pushed by the piston head 142, the micro-nano fluid 160 will flow through the ring gap D or the hole (orifice) A from a zone of the accommodating space 122 to another zone, and a vortex due to the pressure differences will form to transform the kinetic energy into thermal energy. Second, when the micro-nano fluid 160 is pushed by the piston head 142, the micro-nano fluid 160 will flow through the ring gap D or the hole (orifice) A from a zone of the accommodating space 122 to another zone, and a viscous shear force will be generated to be transformed into damping force.

Besides, when both ends of the piston assembly 140 are pushed by outer force, the piston head 142 in the accommodating space 122 of the sleeve 120 will shift toward right according to the outer force applied on the piston rod 144. The micro-nano fluid 160 will flow toward left of the accommodating space 122 of the sleeve 120 relatively according to the moving of the piston head 142. Meanwhile, the work generated by the linear movement of the piston assembly 140 will be transformed into two types: first, when the micro-nano fluid 160 is pushed by the piston head 142, the micro-nano fluid 160 will flow through the ring gap D or the hole (orifice) A from a zone of the accommodating space 122 to another zone, and a vortex due to the pressure differences will form to transform the kinetic energy into thermal energy. Second, when the micro-nano fluid 160 is pushed by the piston head 142, the micro-nano fluid 160 will flow through the ring gap D or the hole (orifice) A from a zone of the accommodating space 122 to another zone, and a viscous shear force will be generated to be transformed into damping force.

Based on the above, the viscosity of the fluid is one of the factors to influence the damping force. Therefore, in the present invention, the surface chemical properties of the $SiO_2$ particles will be modified to form a micro-nano fluid 160 with $SiO_2$ micro-nano particles 164 and silicon oil, and the micro-nano fluid 160 is stable and non-aggregatable. By using the shear thickening effect and shear thinning effect of the suspended particles 164 to improve the friction drag effect, the vibration energy will be absorbed and transformed to thermal energy to dissipate rapidly. The micro-nano fluid damper 100 according to the present invention is an impact-vibration fluid damper. When the vibration happens, the micro-nano fluid 160 with $SiO_2$ nano particles will be forced to flow through the hole A on the piston head 142 or ring gap D between the sleeve 120 and the piston head 142 to generate viscosity for dragging effect. By using the characteristic that the $SiO_2$ nano particles can quickly absorb most of the energy generated by the vibration, the micro-nano fluid damper 100 can provide 300% impact damping performance compared to the conventional fluid damper.

In the present invention, a micro-nano fluid 160 is filled in the sleeve 120 to effectively improve the fluid viscosity to reach a better damping effect. Besides, adding nano grade particles to the conventional fluid can achieve better thermal conduction effect compared to the conventional fluid, and the micro-nano fluid 160 can quickly cool down to minimize the viscosity differences caused by high temperature. The present invention is suitable for being used in the condition of sudden impact or vibration, such as building construction, public works, precision machinery, cars, ships, etc.

In summary, the micro-nano fluid damper 100 according to the present invention provides a damper system having suspended particles 164, and has a micro-nano fluid 160 with both solid and fluid states filled in the sleeve 120. By this arrangement, impact absorption effect can be achieved by better fluid viscosity and thermal conduction the micro-nano fluid 160 has. Meanwhile, the micro-nano fluid 160 can quickly cool down to minimize the viscosity differences caused by high temperature, and thus the micro-nano fluid damper 100 can be widely used in the technique filed that require higher impact absorption standard.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A micro and nano fluid damper, comprising:
   a sleeve having an accommodating space;
   a piston assembly, including a piston head and at least one piston rod, the piston rod being movably disposed in the accommodating space and extending out of the sleeve from a side of the piston head;
   a micro and nano fluid filled between the sleeve and the piston assembly, the micro and nano fluid including a polar basic fluid and a plurality of suspended hydrophobic particles having a diameter smaller than 1 micrometer and comprising up to 50% by weight of the micro and nano fluid and flowing in the accommodating space provided by the back-and-forth movement of the piston, wherein when a shear strain rate of the micro and nano fluid is greater than $1 s^{-1}$, an exponent of velocity of the micro-nano fluid damper is less than 1, and the micro and nano fluid has a shear thinning threshold and a shear thickening threshold.

2. The micro and nano fluid damper according to claim 1, wherein when the shear strain rate is smaller than the shear thinning threshold, the viscosity of the micro and nano fluid decreases with the increasing of the shear strain rate.

3. The micro and nano fluid damper according to claim 1, wherein when the shear strain rate is larger than the shear thinning threshold and smaller than the shear thickening threshold, the viscosity of the micro and nano fluid increases with the increasing of the shear rate.

4. The micro and nano fluid damper according to claim 1, wherein when the shear strain rate is larger than the shear thickening threshold, the viscosity of the micro and nano fluid decreases with the increasing of the shear strain rate.

5. The micro and nano fluid damper according to claim 1, wherein the polar basic fluid is a high polymer fluid.

6. The micro and nano fluid damper according to claim 1, wherein the suspended hydrophobic particles include a plurality of oxide particles, inorganic compound particles, or polymer particles.

7. The micro and nano fluid damper according to claim 1, wherein the piston assembly has two piston rods extending out of the sleeve from two sides of the piston head, respectively.

8. The micro and nano fluid damper according to claim 1, wherein a ring gap is provided between the piston head and an inner side of the sleeve, and the micro and nano fluid flows in the accommodating space through the ring gap.

9. The micro and nano fluid damper according to claim 1, wherein the piston head has at least one hole (orifice), and the micro and nano fluid flows in the accommodating space through the at least one hole (orifice).

10. The micro and nano fluid damper according to claim 1, wherein a ring gap is provided between the piston head and an inner side of the sleeve, the piston has at least one hole (orifice), and the micro and nano fluid flows in the accommodating space through the ring gap and the at least one hole (orifice).

11. The micro and nano fluid damper according to claim 5, wherein the suspended hydrophobic particles are $SiO_2$ nano particles having alkyl groups.

12. The micro and nano fluid damper according to claim 11, wherein the polar basic fluid is polypropylene glycol.

13. The micro and nano fluid damper according to claim 12, wherein the suspended hydrophobic particles and the polar basic fluid are in weight percentage ratios of from 7.5% to 12.5%.

* * * * *